United States Patent [19]
Siebels

[11] Patent Number: 5,810,156
[45] Date of Patent: Sep. 22, 1998

[54] MECHANICAL ANNEALED LAMINATIONS BREAKING APPARATUS

[75] Inventor: Donald Siebels, Springdale, Ark.

[73] Assignee: Emerson Electric Co., St. Louis, Mo.

[21] Appl. No.: 690,256

[22] Filed: Jul. 24, 1996

[51] Int. Cl.⁶ .................................................. B65G 27/00
[52] U.S. Cl. ........................ 198/752.1; 225/93; 209/680
[58] Field of Search ............................... 198/752.1, 766, 198/770, 860.3, 861.1; 225/93; 209/680

[56] References Cited

U.S. PATENT DOCUMENTS

| | | |
|---|---|---|
| 2,627,640 | 2/1953 | Garnich . |
| 3,172,588 | 3/1965 | Bertold et al. . |
| 4,593,810 | 6/1986 | Cook ................................... 198/782 X |
| 4,702,403 | 10/1987 | Curles .............................. 198/752.1 X |
| 5,353,917 | 10/1994 | Maggioni ............................ 198/766 X |

*Primary Examiner*—James R. Bidwell
*Attorney, Agent, or Firm*—Howell & Haferkamp, L.C.

[57] ABSTRACT

A mechanical apparatus for separating annealed laminate plates which have become stuck to one another during an annealing process. The apparatus is positioned along a conveyor path of the annealed laminate plates and is used to vibrate the plates to break them apart. The apparatus is comprised of a power roller conveyor, a vibratory table positioned along the conveyor path, and a cage to prevent the plates from falling from the table when vibrated. A tray of laminate plates is moved onto the table by means of the power roller conveyor. With the cage lowered over the tray of plates, the table is vibrated for a short cycle causing the plates to break apart from one another. The cage is then lifted and the tray of separated plates is conveyed further down the line.

22 Claims, 6 Drawing Sheets

MECHANICAL ANNEALED LAMINATIONS BREAKING APPARATUS

BACKGROUND OF THE INVENTION

(1) Field of the Invention

The present invention pertains to a mechanical apparatus for vibrating articles which have become stuck to one another wherein the vibrations cause the articles to break apart from one another. More particularly, the present invention pertains to a vibrating conveyor apparatus positioned along a conveyor path for separating annealed laminate plates which have become stuck to one another by vibrating the plates to break them apart.

(2) Description of the Related Art

Common electric motors are comprised of a generally cylindrical stator portion and a rotor mounted within the stator for rotation relative to the stator. The axis of rotation of the rotor is concentric with that of the stator. Typically, the rotor and the stator each have three basic parts: the core, the windings, and the insulation. The windings conduct electric currents and the rotor and stator cores conduct a magnetic field produced by the coils of the windings. The cores are usually made of iron or steel, but may also be made of magnetic ceramic materials. A stator core is comprised of a stack of ring-shaped laminate plates. The laminate plates are stacked and bolted or otherwise fastened together to form the generally cylindrical stator core.

In the production of the laminate plates, the plates are cut out of sheet metal using punch presses. Lubricants are used in the punch presses for reducing wear on the cutting tools and dies, and also for improving the quality of the cutting edges. Once the plates have been cut, they are subjected to an annealing process to burn off residual lubricants. The annealing process also normalizes the metal by eliminating dislocations and internal stresses which may have been introduced during machining so that an appropriate electrical path can be set up in the metal plates. During the annealing process, the laminate plates are conveyed through high temperature ovens. The plates are arranged in bundles or stacks as they pass through the annealing step, and frequently the annealing of the plates results in their being stuck to one another. The annealed plates must then be broken apart so that they can be used in the construction of electric motors.

The most common prior art method used to break the annealed plates apart involves manually lifting a bundle or stack of the laminate plates and dropping them down onto a hard surface. The impact on the hard surface usually serves to separate the laminate plates from one another, but also tends to cause damage to a substantial percentage of the plates. This labor-intensive method of breaking the plates apart is slow and inefficient. Moreover, the lifting and dropping of the stacks of laminate plates, which can weigh up to a hundred pounds, is dangerous and may result in injuries to the manual laborers.

SUMMARY OF THE INVENTION

An objective of the present invention is to provide an apparatus which automatically breaks annealed laminate plates apart so that the plates can be used in the construction of the electric motors, thereby eliminating the need for manual laborers in the breaking process. It is another object of this invention to provide an apparatus having the capacity to take a large quantity of the laminate plates at one time, thereby expediting the production process. A further object of the invention is to provide an apparatus which breaks the plates apart without substantial damage to the plates which would impair their use in the construction of electric motors.

The apparatus of the present invention is a mechanical system for separating the annealed laminate plates which have become stuck to one another during the annealing process. The apparatus is positioned beneath or otherwise adjacent to a work surface supporting the plates. Specifically, the apparatus is positioned along the conveyor path of the annealed laminate plates and is used to vibrate the plates to break them apart. The apparatus is comprised of a power roller conveyor for conveying trays of annealed laminate plates, a vibratory table positioned along the conveyor path for vibrating the tray of plates to separate the plates from one another, and a retaining cage for preventing the plates from falling from the table while the plates are being vibrated. A tray of the laminate plates is conveyed onto the vibratory table by the roller conveyor. The cage is lowered over the tray of plates and the table is vibrated for a short cycle causing the plates to break apart from one another. The cage is then lifted and the tray of separated plates is conveyed further down the line.

The power roller conveyer has a substantially horizontal conveying surface defined by a plurality of cylindrical rollers arranged in a series which extends in a downstream direction of the conveyor. Each cylindrical roller is arranged so that its axis of rotation is perpendicular to the downstream direction of the conveyor. The rollers are spaced from one another to define open areas between the rollers.

The vibratory table is positioned below the rollers of the power roller conveyor. The table is comprised of a horizontal portion and a plurality of upstanding members mounted on the top surface of the horizontal portion and arranged in a series which extends in the downstream direction of the conveyor. The upstanding members are spaced apart from one another at distances which approximate the spacing between the rollers of the roller conveyor so that each upstanding member corresponds to one of the open areas between the rollers of the roller conveyor.

The vibratory table is mounted to a fixed surface by adjustable air mounting elements which support the table for vibration of the table relative to the fixed surface and relative to the conveying surface. The vibratory table is moveable between an up position and a down position by adjusting the air mounting elements. The upstanding members extend upwardly from the horizontal portion of the table toward the conveying surface and terminate just below the conveying surface when the vibratory table is in a down position. When the vibratory table is in the up position, the upstanding members extend upwardly and terminate just above the conveying surface, thereby supporting the tray of annealed laminate plates just above the conveying surface.

At least one electric motor vibrator is mounted to the bottom side of the vibratory table for setting the table into vibrating movement relative to the fixed surface and relative to the conveying surface. With the vibratory table in the up position and the tray of annealed laminate plates being supported above the conveying surface by the upstanding members of the table, the electric motor vibrator is actuated thereby setting the vibratory table and the tray of plates into vibrating movement.

A retaining cage is mounted above the conveying surface and is moveable between up and down positions by linear actuators, such as hydraulic or pneumatic actuators. The cage has a substantially rectangular configuration defined by four vertical side walls and a horizontal top wall. When in the up position, the cage is above the conveying surface a distance sufficient to permit trays of annealed laminate plates to be conveyed along the conveying surface beneath the cage. In the down position, the vertical side walls of the cage surround the tray of plates on the conveying surface to prevent the plates from inadvertently falling from the conveying surface while they are being vibrated. The retaining cage may be insulated to suppress noise caused by vibration of the table.

While the principle advantages and features of the present invention have been described above, a more complete and thorough understanding and appreciation for the invention may be attained by referring to the drawings and description of the preferred embodiment which follow.

DETAILED DESCRIPTION OF THE PREFERRED EMBODIMENT

Figure 1:
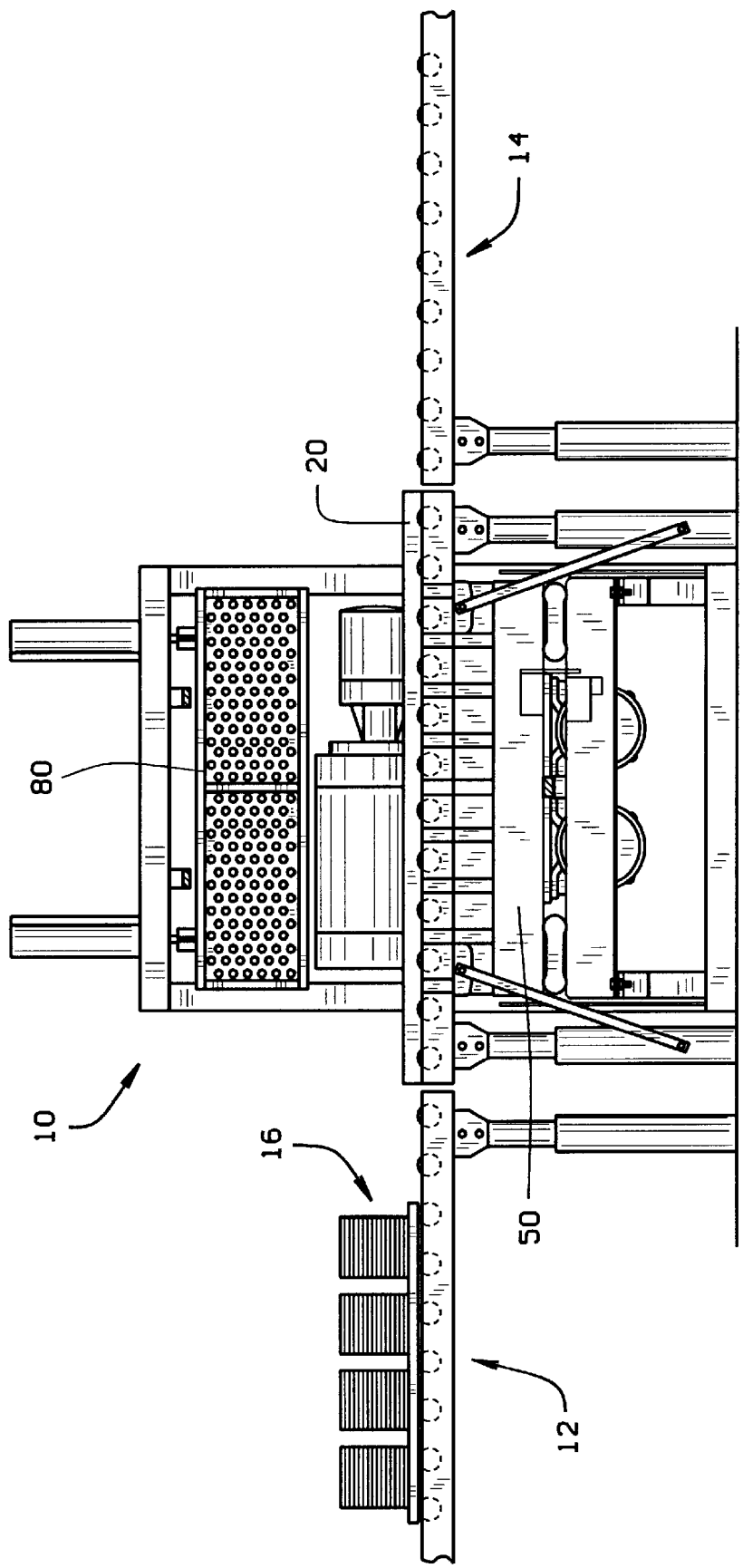
FIG. 1 is a front elevational view of the mechanical annealed laminations breaking apparatus of the present invention, shown installed with a conveyor system.

The mechanical annealed laminations breaking apparatus of the present invention is shown generally as 10 in FIG. 1. The apparatus 10 is shown installed with a roller conveyor system 12, 14 which is used for conveying trays of annealed laminate plates 16 in a downstream direction.

The apparatus 10 includes a power roller conveyor 20 positioned along the path of the conveyor system 12, 14 between an upstream segment of the conveyor system 12 and a downstream segment of the conveyor system 14 for conveying the trays of annealed laminate plates 16. A vibratory table 50 is positioned along the conveyor path and beneath the power roller conveyor 20 for vibrating the tray of plates 16 to separate the plates from one another. A retaining cage 80 is used for preventing the plates 16 from falling from the vibratory table 50 while the plates 16 are being vibrated The apparatus 10 is shown in more detail in FIGS. 2–5.

The power roller conveyer 20 has a substantially horizontal conveying surface 22 defined by a plurality of cylindrical rollers 24 arranged in a series which extends in the downstream direction of the conveyor system. The cylindrical rollers 24 are arranged laterally with respect to the downstream direction of the conveyor system so that the axis of rotation of each roller 24 is perpendicular to the downstream direction of the conveyor system. The rollers 24 are spaced from one another to define open areas 26 between the rollers 24. Preferably, twelve rollers 24 are used, each having a 2½" diameter. The rollers 24 are spaced from one another with the centers of the rollers 6" apart. Thus, the open areas 26 between the rollers 24 are 3½" wide. The series of rollers 24 extends 6 feet in the downstream direction. However, in other embodiments of this invention, different dimensions may be used without departing from the scope of what is claimed:

The rollers 24 are chain driven by an electric motor 28. The chain drive system is known in the art. Preferably, a ¾ horsepower motor is mounted to one side of the conveying surface 22 for chain driving the rollers 24 of the power roller conveyor 20. For safety, a power roller guard 30 conceals the chain.

The power roller conveyor 20 also includes at least one photo-electric eye sensor 32 adjacent to the conveying surface 22 for sensing when a tray of annealed laminate plates 16 has been conveyed onto the proper position above the vibratory table 50. When the photo-electric eye sensor 32 detects the tray of plates 16, the electric motor 28 is turned off to stop the power rollers 24.

The vibratory table 50 is positioned below the rollers 24 of the power roller conveyor 20. The vibratory table 50 has a horizontal rectangular portion 52 and a plurality of upstanding members 54 mounted on the top surface 56 of the horizontal portion 52. Each upstanding member 54 has an elongate parallelepiped shape and is positioned perpendicular to the downstream direction of the conveyor system. The upstanding members 54 are arranged in a series which extends in the downstream direction of the conveyor and are spaced from one another such that each upstanding member corresponds to one of the open areas 26 between the rollers 24.

Preferably nine upstanding members 54 are used, each having a width of 2". The upstanding members 54 are spaced from one another with the centers of the members 6" apart so that each of the upstanding members 54 is centered within one of the 3½" open areas 26 between the rollers 24. Again, in other embodiments of this invention, different dimensions may be used without departing from the scope of what is claimed.

Figure 2:
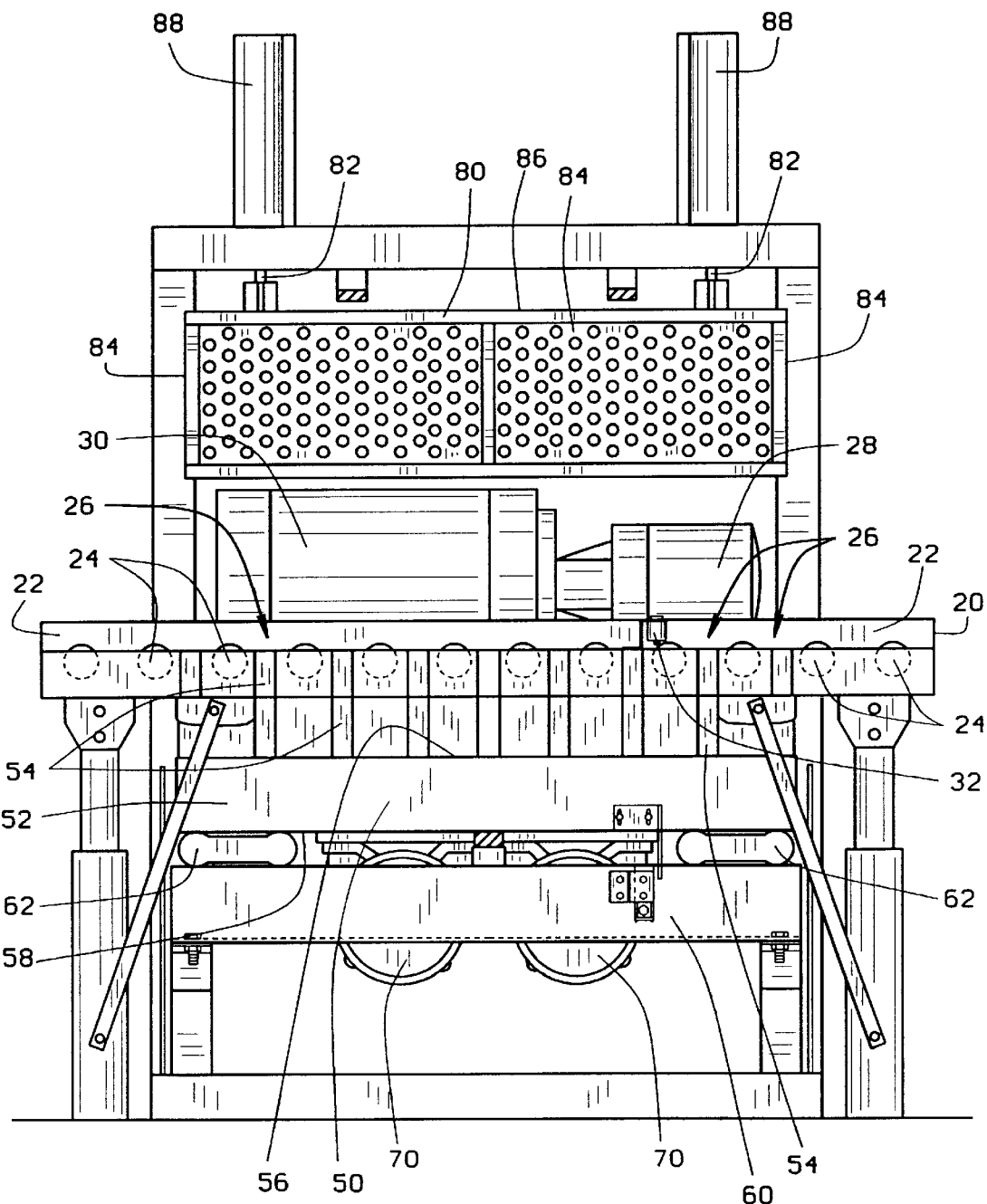
FIG. 2 is a more detailed front elevational view of the mechanical annealed laminations breaking apparatus, shown with the retaining cage in the up position and the vibratory table in the down position.
Figure 3:
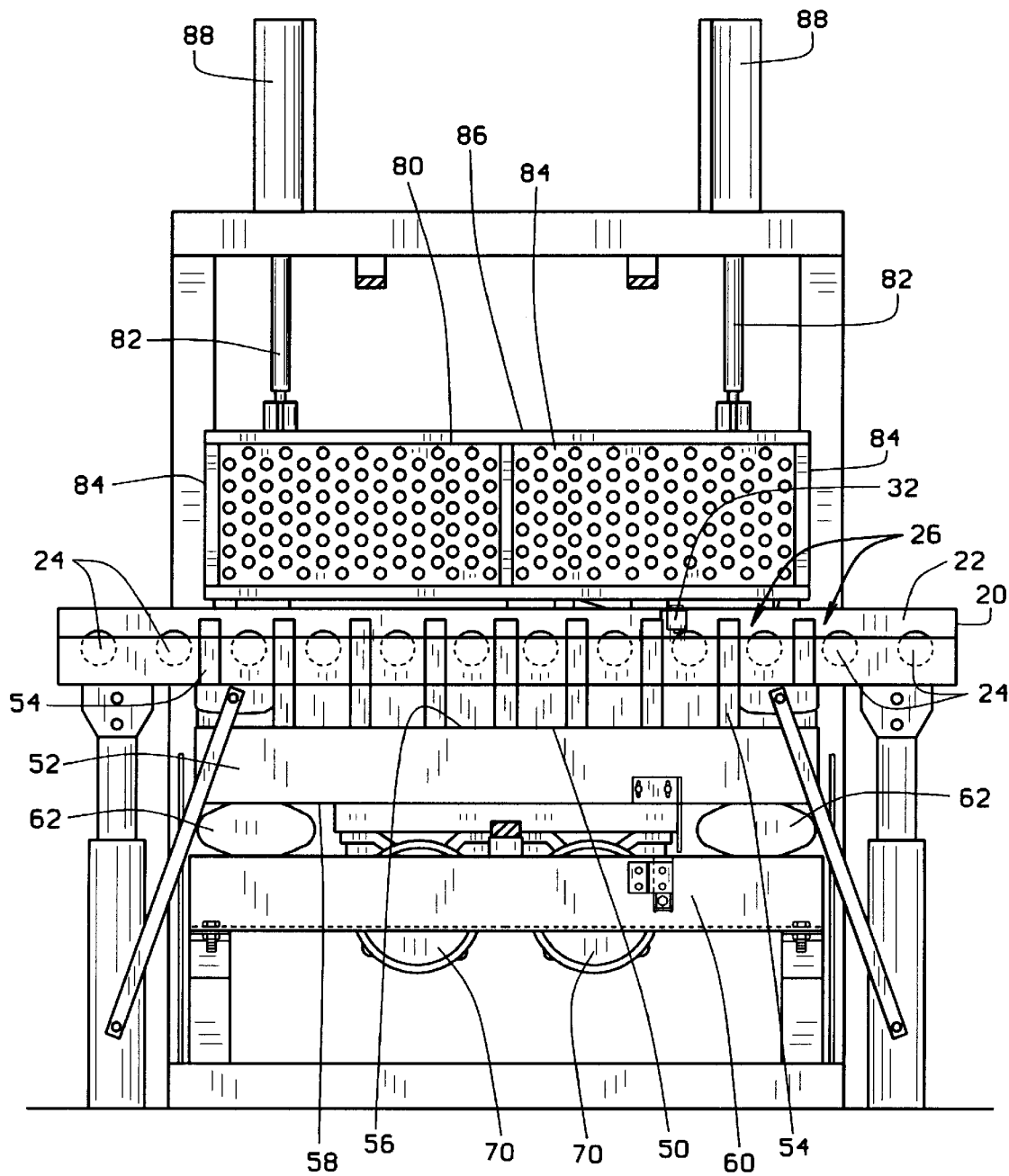
FIG. 3 is a front elevational view of the apparatus, shown with the retaining cage in the down position and the vibratory table in the up position.
Figure 4:
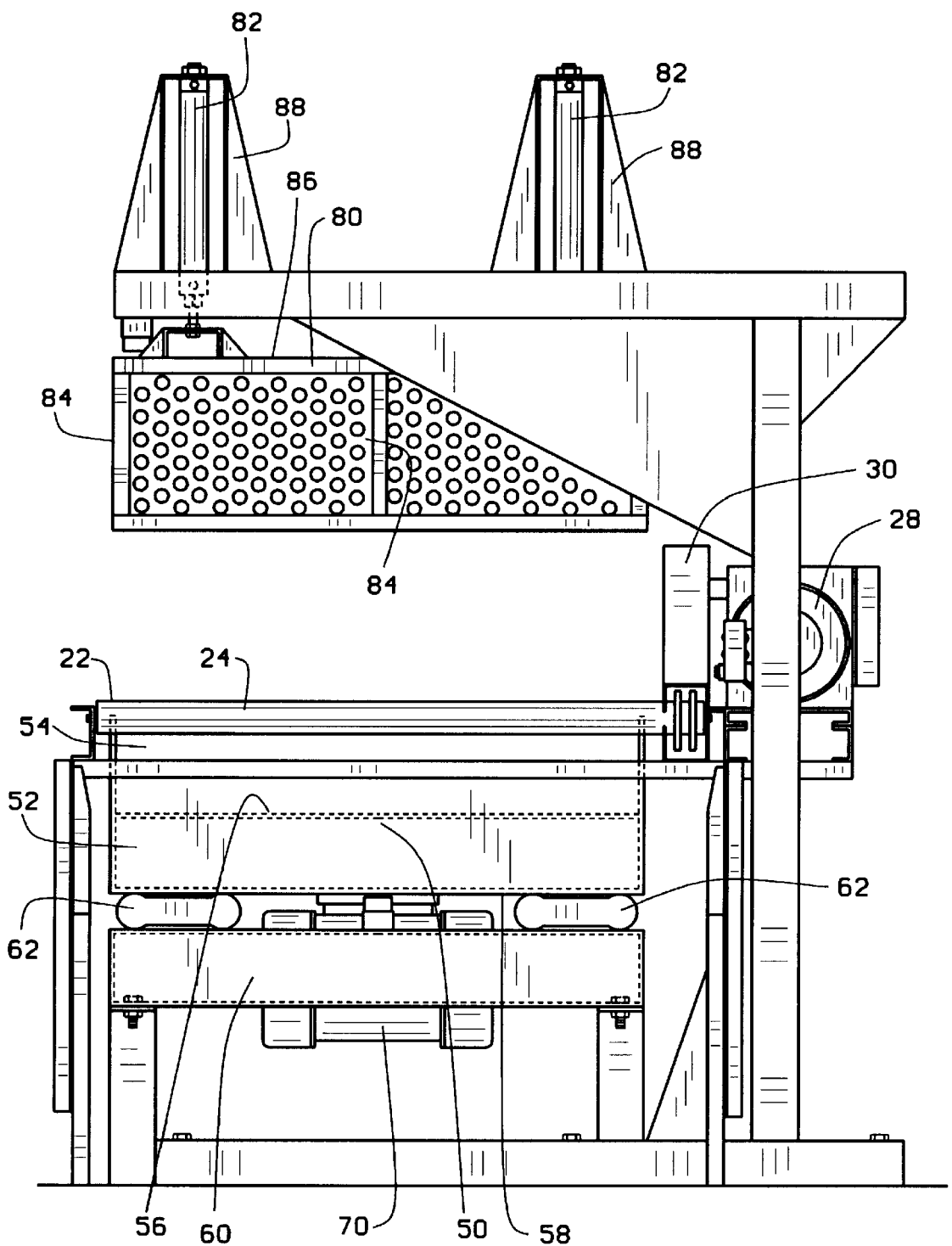
FIG. 4 is a side elevational view of the apparatus, shown with the retaining cage in the up position and the vibratory table in the down position.
Figure 5:
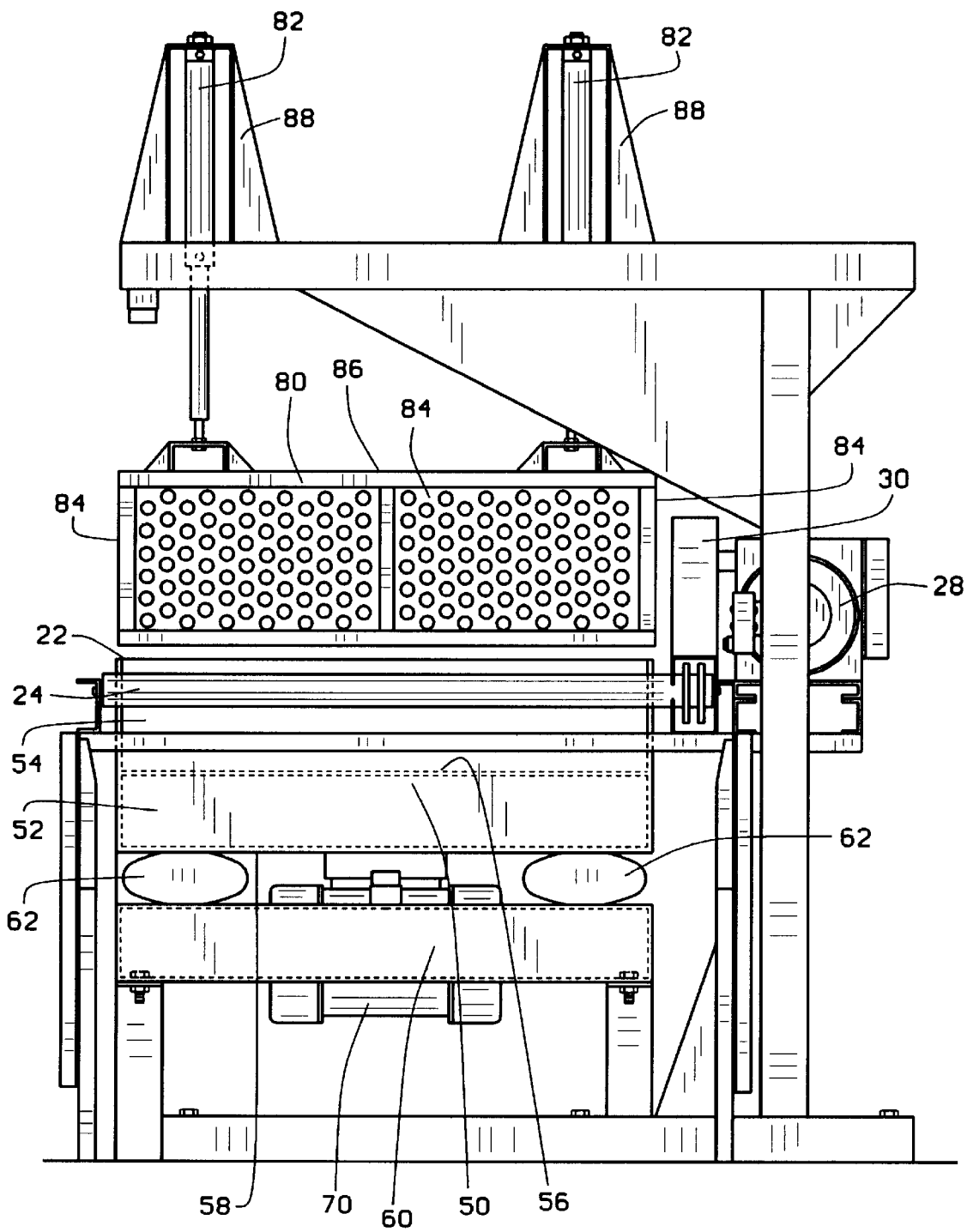
FIG. 5 is a side elevational view of the apparatus, shown with the retaining cage in the down position and the vibratory table in the up position.

The vibratory table 50 is isolated from the rest of the apparatus 10 by inflatable air mounts 62 which are positioned between the horizontal rectangular portion 52 of the vibratory table 50 and a frame 60. The air mounts serve as springs which support the vibratory table 50 for vibrating movement relative to the frame 60 and relative to the conveying surface 22. The air mounts 62 also serve as means for moving the vibratory table 50 between an up position and a down position. By increasing or decreasing the inflation pressure within the air mounts 62, the height of the air mounts 62 can be increased or decreased. Thus, when the inflation pressure within the air mounts 62 is increased, the vibratory table 50 is raised to the up position, as shown in FIGS. 3 and 5. Similarly, when the inflation pressure of the air mounts 62 is decreased, the vibratory table 50 is lowered to the down position, as shown in FIGS. 2 and 4. In the preferred embodiment, four air mounts 62 are used, one positioned at or near each corner of the bottom surface 58 of the horizontal rectangular portion 52 of the vibratory table 50.

The upstanding members 54 extend upwardly from the top surface 56 of the horizontal rectangular portion 52 of the vibratory table 50 toward the conveying surface 22 and within the open areas 26 between the rollers 24. The upstanding members 54 extend upwardly to a point just below the conveying surface 22 when the vibratory table 50 is in the down position. When the vibratory table 50 is in the up position, the upstanding members 54 extend upwardly to a point just above the conveying surface 20. Thus, when the vibratory table 50 is in the up position and the upstanding members 54 are extended upwardly between the rollers 24 to a point just above the conveying surface 22, a tray of annealed laminate plates 16 is lifted off of the conveying surface 22 and supported only by the upstanding members 54 of the vibratory table 50.

In the preferred embodiment, the tops of the upstanding members 54 are approximately ¾" below the top of the rollers 24 when the vibratory table is in the down position, and approximately 1⅛" above the top of the rollers 24 when the vibratory table is in the up position. Thus, in the preferred embodiment, the range of the vibratory table permitted by adjusting the air mounts 62 is approximately 1⅞".

Figure 6:
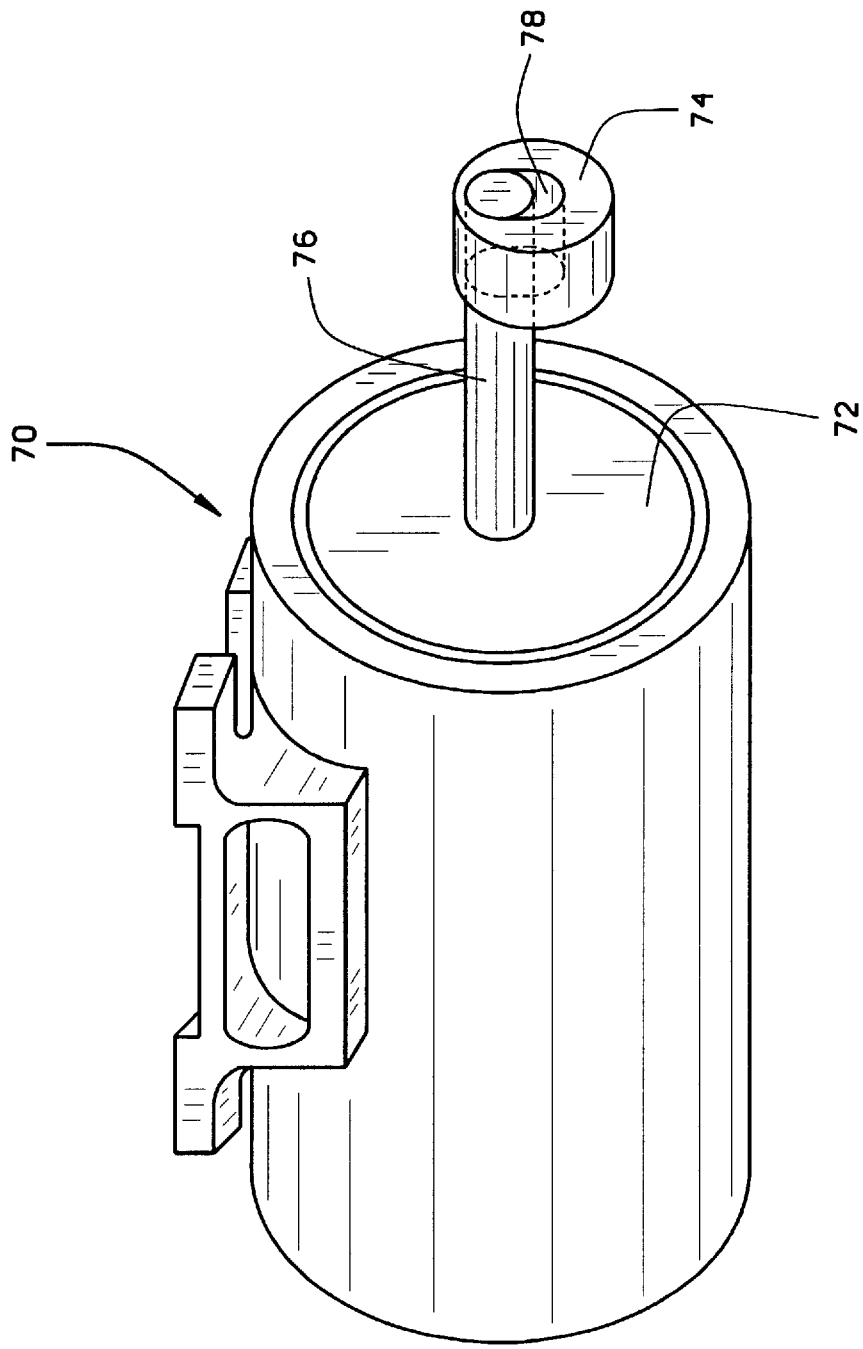
FIG. 6 shows an electric motor vibrator with an adjustable eccentric weight.

At least one electric motor vibrator 70 is mounted to the bottom surface 58 of the horizontal rectangular portion 52 of the vibratory table 50 for setting the table into vibrating movement relative to the frame 60 and relative to the conveying surface 22. Electric motor vibrators are known in the art and, as shown in FIG. 6, consist essentially of an electric motor 72 with a weight 74 mounted eccentrically on the motor shaft 76 so that the motor 72 imparts vibrations when in operation.

In the preferred embodiment of the present invention, two 1½ horsepower electric motor vibrators 70 are mounted side-by-side to the bottom surface 58 of the horizontal rectangular portion 52 of the vibratory table 50. The motors operate at a fixed speed of 1200 rpm. Each weight 74 includes a radial slot 78 for adjusting the position of the weight 74 relative to the motor shaft 76. The degree of eccentricity of the weight 74 can therefore be adjusted by sliding the weight 74 radially relative to the motor shaft 76 and securing the weight 74 to the motor shaft 76 at a point along the slot 78, such as by a set screw (not shown). Thus, the force of the vibration created by the electric motor vibrators 70 can be controlled by the degree of eccentricity of the weights 74 to suit the requirements for a particular use of the apparatus 10.

With the vibratory table 50 in the up position and the tray of annealed laminate plates 16 being supported above the conveying surface 22 by the upstanding members 54 of the vibratory table 50, the electric motor vibrators 70 are actuated thereby setting the vibratory table 50 and the tray of plates 16 into vibrating movement.

A retaining cage 80 is mounted to the frame 60 above the conveying surface 22 and is moveable between up and down positions by pneumatic actuators 82. In the preferred embodiment, four air cylinders 82 are used to raise and lower the retaining cage 80. For safety, air cylinder safety covers 88 conceal the air cylinders 82. The cage 80 has a substantially rectangular configuration defined by four vertical side walls 84 and a horizontal top wall 86.

As shown in FIGS. 2 and 4, when in the up position, the retaining cage 80 is above the conveying surface 22 a distance sufficient to permit trays of annealed laminate plates 16 to be conveyed along the conveying surface 22 beneath the cage 80. As shown in FIGS. 3 and 5, when in the down position, the vertical side walls 84 and top wall 86 of the cage 80 surround the tray of plates 16 on the conveying surface 22 and serve to prevent the plates 16 from inadvertently falling from the conveying surface 22 while they are being vibrated. The retaining cage 80 may be insulated to suppress noise caused by vibration of the table 50.

In operation, a tray of annealed laminate plates 16 is conveyed from the upstream segment of the conveyor system 12 to the power roller conveyor section 20 of the apparatus 10. Conveyance of the tray of plates 16 is continued along the conveying surface 22 of the power roller conveyor 20 until the tray of plates 16 is appropriately positioned above the vibratory table 50. When the photoelectric eye sensor 32 detects the tray of plates 16, the electric motor 28 is turned off thereby stopping the chain driven power rollers 24. Once the rollers 24 stop, the inflation pressure within the air mounts 62 is increased, thereby raising the vibratory table 50 to the up position so that the tray of annealed laminate plates 16 is lifted off of the conveying surface 22 and supported only by the upstanding members 54 of the vibratory table 50. The retaining cage 80 is lowered by the air cylinders 82 to surround the tray of plates 16 on the conveying surface 22. Then, the electric motor vibrators 70 are operated for a short cycle thereby setting the vibratory table 50 and the tray of plates 16 into vibrating movement to break the plates apart. After the vibrators 70 have stopped, the inflation pressure in the air mounts 62 is decreased, thereby lowering the vibratory table 50. The retaining cage 80 is then raised by the air cylinders 82 above the conveying surface 22 a distance sufficient to permit the tray of plates 16 to be conveyed along the conveying surface 22 beneath the cage 80 to the downstream portion 14 of the conveyor, and the power roller conveyor section 20 is activated to convey the tray and separated plates onto the downstream conveyor section 14.

While the present invention has been described by reference to a specific embodiment, and a particular use, it should be understood that modifications and variations of the invention may be constructed, and different uses of the invention may be made, without departing from the scope of the invention in the following claims.

What is claimed is:

1. An apparatus for vibrating articles, the apparatus comprising:

a table mounted to a fixed surface by at least one mounting element which supports the table for vibrating movement of the table relative to the articles;

a vibrator connected to the table for setting the table into vibrating movement relative to the articles; and means for selectively moving the table relative to the articles to a position where the table engages the articles so that the vibrating movement of the table is translated into vibrating movement of the articles.

2. The apparatus of claim 1 further comprising:

a work surface for supporting the articles, the table being positioned under the work surface, wherein the vibrator sets the table into vibrating movement relative to the work surface, and wherein the means for selectively moving the table move the table relative to the work surface so that the table can engage the articles on the work surface so that the vibrating movement of the table is translated into vibrating movement of the articles on the work surface.

3. The apparatus of claim 2 further comprising:

a retaining cage having a top wall and at least one side wall depending downwardly from the top wall, the cage being moveable between a first position wherein the cage is positioned away from the work surface a distance sufficient to permit the articles to be placed on or removed from the work surface, and a second position wherein the vertical side wall of the cage surrounds the articles on the work surface to prevent the articles from inadvertently falling from the work surface when the table is vibrating.

4. The apparatus of claim 3 wherein the retaining cage is insulated to suppress noise caused by vibration of the table and the articles.

5. The apparatus of claim 3 wherein in the first position the cage is positioned above the work surface a distance sufficient to permit the articles to be placed on or removed from the work surface beneath the cage, and in the second position the cage is lowered toward the work surface so that the vertical side wall of the cage surrounds the articles on the work surface to prevent the articles from inadvertently falling from the work surface when the table is vibrating.

6. The apparatus of claim 3 wherein the retaining cage is moved between its first and second positions by at least one actuator.

7. The apparatus of claim 2 wherein the work surface is a substantially horizontal conveying surface defined by a plurality of cylindrical rollers arranged in a horizontal plane for conveying the articles in a downstream direction, each cylindrical roller having an axis of rotation perpendicular to the downstream direction, at least some of the plurality of rollers being spaced from one another to define access areas between the rollers.

8. The apparatus of claim 7 wherein said means for selectively raising the table includes means for moving the vibratory table between first and second positions relative to the fixed surface and relative to the conveying surface, the vibratory table being positioned away from the articles on the conveying surface when in the first position, and the vibratory table engaging the articles on the conveying surface when in the second position.

9. The apparatus of claim 8 wherein the vibratory table is positioned below the conveying surface when in the first position, and wherein a portion of the vibratory table extends above the conveying surface through the access areas when the vibratory table is in the second position so that the portion of the table engages the articles on the conveying surface.

10. The apparatus of claim 8 wherein said means for moving the table is a resilient inflatable bladder capable of maintaining first and second inflation pressures, vertical dimensions of the bladder increasing when inflation pressure of the bladder is increased, the vibratory table being in the first position when the bladder is at the first inflation pressure, and the vibratory table being in the second position when the bladder is at the second inflation pressure.

11. A vibrating conveyor apparatus for vibrating articles being conveyed in a downstream direction, the apparatus comprising:

a substantially horizontal conveying surface defined by a plurality of cylindrical rollers arranged in a horizontal plane, each cylindrical roller having an axis of rotation perpendicular to the downstream direction, the plurality of rollers being arranged in the horizontal plane to define an access area between the rollers;

a vibratory table positioned below the conveying surface, the table having an upstanding member extending upwardly toward the conveying surface;

at least one mounting element for mounting the table to a fixed surface, said at least one mounting element supporting the table for vibrating movement of the table relative to the fixed surface and relative to the conveying surface; and a vibrator connected to the table for setting the table into vibrating movement relative to the fixed surface and relative to the conveying surface, the upstanding member of the vibratory table extending upwardly through the access area and engaging the articles on the conveying surface so that the vibrating movement of the table is translated into vibrating movement of the articles on the conveying surface.

12. The apparatus of claim 11 wherein said at least one mounting element is configured for moving the vibratory table between first and second positions, the upstanding member of the vibratory table extending upwardly toward the conveying surface and terminating within the access area below the conveying surface when the vibratory table is in the first position so that the articles on the conveying surface can be conveyed on the conveying surface without obstruction, and the upstanding member of the vibratory table extending upwardly toward the conveying surface through the access area and terminating above the conveying surface when the vibratory table is in the second position so that the articles are lifted above the conveying surface and supported by the upstanding member.

13. The apparatus of claim 12 wherein said at least one mounting element is a resilient inflatable bladder capable of maintaining first and second inflation pressures, a vertical dimension of the bladder increasing when the inflation pressure of the bladder is increased, the vibratory table being in the first position when the bladder is at the first inflation pressure, and the vibratory table being in the second position when the bladder is at the second inflation pressure.

14. The apparatus of claim 11 wherein the plurality of cylindrical rollers are arranged in a series which extends in the downstream direction, the rollers being spaced from one another to define a plurality of access areas between the rollers with one of the plurality of access areas adjacent to each of the rollers, and wherein the table has a plurality of upstanding members arranged in a series which extends in the downstream direction, the upstanding members being spaced from one another so that each upstanding member of the plurality of upstanding members is positioned within one of the plurality of access areas between the rollers.

15. The apparatus of claim 11 wherein the vibrator is an electric motor vibrator having an eccentrically mounted weight.

16. The apparatus of claim 15 wherein the eccentrically mounted weight of the electric motor vibrator is adjustable to thereby adjust the amplitude of vibration.

17. The apparatus of claim 11 including a retaining cage mounted above the conveying surface, the cage having a substantially rectangular configuration defined by four vertical side walls and a horizontal top wall, the cage being moveable between a first position wherein the cage is positioned above the conveying surface a distance sufficient to permit the articles to be conveyed along the conveying surface beneath the cage and a second position wherein the cage is lowered so that the vertical side walls surround the articles on the conveying surface to prevent the articles from inadvertently falling from the conveying surface when the vibratory table is vibrating.

18. The apparatus of claim 17 wherein the retaining cage is insulated to suppress noise caused by vibration of the table and the articles.

19. The apparatus of claim 17 wherein the retaining cage is moved between its first and second positions by at least one actuator.

20. The apparatus of claim 11 including a sensor adjacent the conveying surface for detecting when the articles being conveyed on the conveying surface are positioned above the vibratory table.

21. A method for separating articles adhered to one another in groups, the method comprising the steps of:

conveying the articles on a conveying surface in a downstream direction to a vibratory table;

moving the vibratory table relative to the conveying surface so that at least a portion of the table engages the articles on the conveying surface;

vibrating the vibratory table for a short cycle so that vibrating movement of the table is translated into vibrating movement of the articles on the conveying surface, the vibration serving to separate the articles from one another;

moving the vibratory table relative to the conveying surface so that the table disengages the articles on the conveying surface; and conveying the separated articles downstream of the vibratory table.

22. The method of claim 21 including the steps of:

lowering a retaining cage toward the conveying surface prior to vibrating the table so that the cage surrounds the articles on the conveying surface and prevents the articles from inadvertently falling from the conveying surface when the table is vibrated; and raising the retaining cage after the short vibration cycle of the table has ended so that the separated articles can be further conveyed downstream of the vibratory table.

* * * * *